Jan. 10, 1928.
C. O. ROTHWEILER
1,655,627
CONVERTIBLE UTILITY LEVEL
Filed Dec. 17, 1924      2 Sheets-Sheet 1
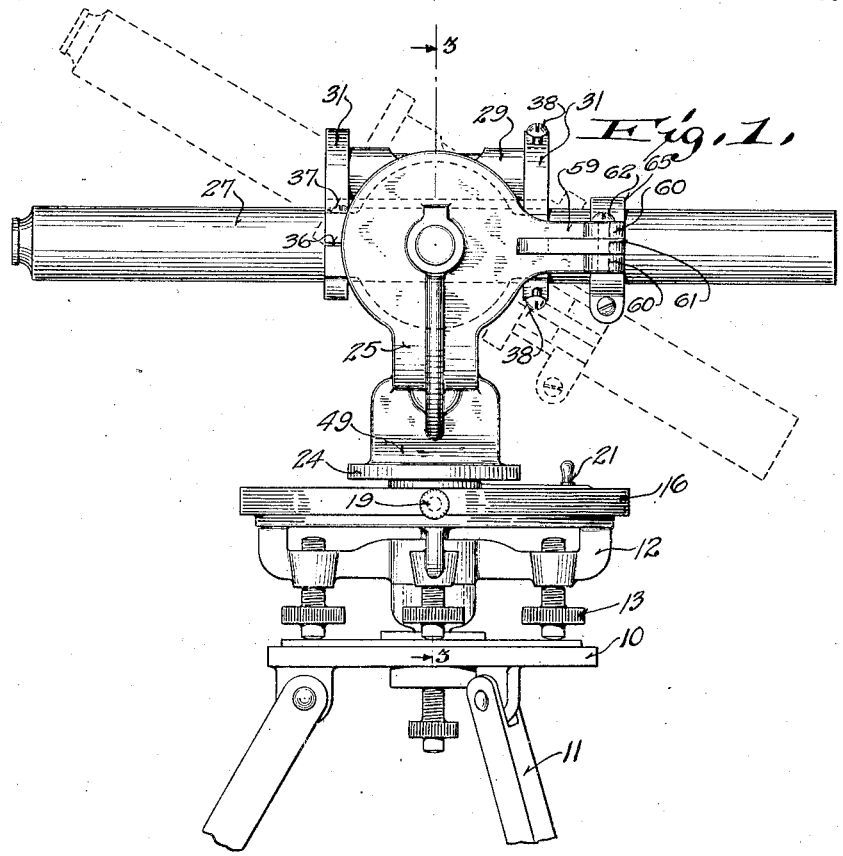
WITNESSES
George Mueller.
M. E. Downey
INVENTOR.
Charles O. Rothweiler
By R. & C. Caldwell
ATTORNEY.

Jan. 10, 1928.
C. O. ROTHWEILER
1,655,627
CONVERTIBLE UTILITY LEVEL
Filed Dec. 17, 1924 2 Sheets-Sheet 2
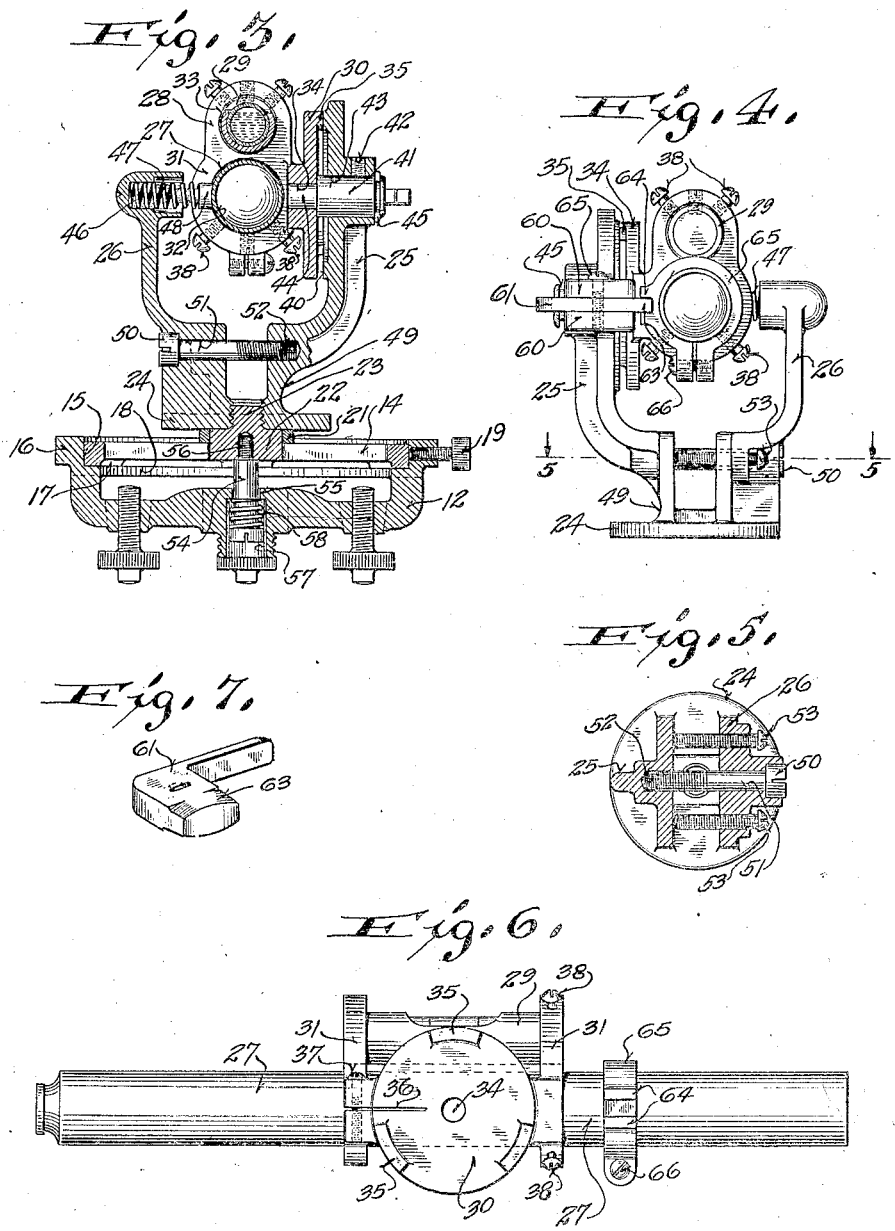
WITNESSES
George Mueller
M. E. Downey
INVENTOR.
Charles O. Rothweiler
By R. S. Caldwell
ATTORNEY.

Patented Jan. 10, 1928.

1,655,627

UNITED STATES PATENT OFFICE.

CHARLES O. ROTHWEILER, OF MILWAUKEE, WISCONSIN, ASSIGNOR TO DAVID WHITE COMPANY, OF MILWAUKEE, WISCONSIN, A CORPORATION OF WISCONSIN.

CONVERTIBLE UTILITY LEVEL.

Application filed December 17, 1924. Serial No. 756,517.

The invention relates to leveling instruments and more particularly to the type in which the telescope may be swung in a vertical plane for sighting at an angle.

In some types of leveling instruments, the telescope is pivotally mounted to swing in a vertical plane in the manner of a transit for the purpose of running a line of stakes, determining the perpendicularity of structural members, and other operations, but difficulty has been experienced in bringing the telescope back to a horizontal position when conditions require it, since it has been customary to rely on the registration of index marks, which is not particularly accurate and cannot be rapidly effected. Also, the telescope pivots commonly extend on opposite sides of the telescope barrel where they are journalled in standards, which construction is not suitable for use in an inexpensive instrument required to be of rugged character.

An object of the present invention is to provide a convertible level in which the pivoted telescope may be rapidly and accurately brought to and maintained in a level condition after having been used in an inclined position.

Another object of the invention is to obtain such placement of the telescope by a movable locking member mounted on a standard at a distance from the pivotal axis of the telescope and engageable directly with the telescope.

A further object of the invention is to provide a rugged and inexpensive pivot construction for the telescope which will facilitate and maintain accurate alignment of the parts and avoid undesired play between them.

A further object of the invention is to provide a pivot construction which will prevent the entrance of foreign matter between the bearing surfaces and thus avoid misalignment and rapid wear.

A further object of the invention is to provide simple and effective means for adjusting the telescope so that its sighting axis will lie in a plane through the vertical axis of the level.

A further object of the invention is to provide spring-urged means for maintaining in engagement against vertical play the parts permitting relative rotation of the telescope in a horizontal plane.

The invention further consists in the several features hereinafter set forth and more particularly defined by the annexed claims.

In the accompanying drawings, Fig. 1 is a side elevation of a device embodying the invention;

Fig. 2 is a plan view thereof, parts being broken away and parts being shown in section;

Fig. 3 is a transverse sectional view taken on the line 3—3 of Fig. 1;

Fig. 4 is a front end view of the telescope and its standards;

Fig. 5 is a sectional view taken on the line 5—5 of Fig. 4;

Fig. 6 is a side elevation of the telescope with its mounting members; and

Fig. 7 is a detail perspective view of a locking member.

In these drawings 10 indicates a lower leveling plate on which are mounted in the usual manner the legs 11 and an upper leveling plate 12, leveling screws 13 being provided to obtain a level condition of the upper plate when the instrument is in use. A circular spider plate 14 is adapted to rotate within a circular recess 15 in the annular portion 16 of the upper leveling plate 12 and is provided with three substantially equally spaced pads 17 on its under bearing surface engageable with the bottom 18 of the recess. The usual clamping screw 19 is threaded radially into the annular rim 16 and is adapted to engage the periphery of the spider plate 14 to lock it in position against rotation. The leveling plate 12 is provided with the usual graduated circle 20 extending around the spider plate 14, and an index arm 21 pivotally mounted on a central boss 22 of the spider plate 14 extends radially outward therefrom to a position adjacent the edge of the circle, the index arm being frictionally retained in an adjusted position in the usual manner.

The boss 22 on the circular spider plate 14 carries an upwardly extending threaded projection 23 on which a forked standard member 24 is screwed for attachment to the spider plate, the fork projections 25 and 26 of the standard member extending upwardly to form standards receiving the telescope 27 between them.

The telescope barrel 27 has its central portion clamped in a mounting member 28 which also carries a bubble tube 29 above the telescope. The mounting member 28 is preferably a casting comprising a circular bearing plate 30 having spaced projections 31 extending at right angles thereto and provided with aligned openings 32 and 33 to receive the telescope and bubble tube, respectively. The bearing plate 30 is provided with a central bore 34 and three substantially equally spaced segmental bearing pads 35 near its periphery. A slot 36 extends transversely of one of the projections 31 and terminates at the opening 32 receiving the telescope, so that a limited amount of spring action is obtained to permit a screw 37 to clamp the split parts of this projection 31 on the telescope. At the point where the telescope passes through the other projection 31, adjusting and clamping screws 38 are provided to center the telescope in order that the axis of the bore 34 in the bearing plate will intercept the telescope sighting axis, to which it is normal. The bubble tube 29 is provided with a similar adjustment at one end in order to secure parallelism with the telescope.

The bearing pads 35 are disposed in a vertical plane parallel to a vertical axial plane through the telescope and are adapted to engage an annular plane bearing surface 40 on the standard 25. While plane bearing surfaces are preferred for facility in manufacture, conical or spherical surfaces may also be used. A pivot member 41 is secured by screw 42 in a bore 43 in the standard, and has its reduced inner end 44 disposed in the bore 34 of the bearing plate 30, the outer end of the pivot member being provided with an annular groove 45 to facilitate its removal from the bore 43.

The standard 26 is provided with a recess 46 coaxial with the bore 43 in the standard 25, and a coil spring 47 disposed in the recess presses on the telescope barrel by means of an interposed saddle 48 to urge the bearing pads 35 into engagement with the annular bearing surface 40 on the standard 25.

In order to place the sighting axis of the telescope in a plane passing through the vertical axis of the level for initial adjustment and also for adjustment after wear has occurred, the standard 25 is reduced in section at 49 near its base to render it capable of yielding for affording a limited lateral adjustment at the upper end of the standard. The standard 26 is made relatively rigid and a screw 50 disposed in a bore 51 in this standard enters a threaded opening 52 in the standard 25 by which the latter standard may be drawn inwardly a small distance. Screws 53 are threaded in the standard 26 on each side of the screw 50 and bear against the standard 25 to move it outwardly or to limit its inward movement, so that by a mutual adjustment of the screws 50 and 53, the standard 25 may be adjusted and locked in its proper position.

The circular spider plate 14 which supports the standard member 24 has its spaced bearing pads 17 held into engagement with the bottom of the recess 18 by axially acting spring pressure. For this purpose a screw 54 extending upwardly through an opening 55 in the upper leveling plate 12 enters a threaded opening 56 in the hub 22 of the spider plate, and a counterbore 57 in the leveling plate 12 forms an annular shoulder with the bore 55, the counterbore 57 housing a spring 58 which is interposed between this shoulder and the head of the screw to hold the bearing surfaces of the spider plate and leveling plate together under pressure.

The standard 25 is provided with a pair of spaced horizontally extending projections 59 having transversely extending terminal portions 60 between which an L-shaped locking lever 61 is pivotally mounted by means of a screw 62, the projections 59 having a slight spring action for frictionally retaining the locking lever between them in its operative positions. The inner end 63 of the locking lever is suitably curved, as seen in Fig. 7, and is disposed adjacent the telescope barrel to engage between fingers 64 of a split collar 65 clamped about the telescope barrel by means of a screw 66.

For leveling operations the telescope is firmly held in horizontal position by the engagement of the locking lever 61 with the collar 65. When it is desired to tilt the telescope the locking lever is moved to the dotted line position of Fig. 2, whereupon the telescope will be free for adjustment in a vertical plane, it being held in adjusted angular position by the frictional engagement between the bearing pads 35 of the bearing plate 30 and the annular bearing surface 40 on the standard 25. In order to again bring the telescope back to a horizontal position it is only necessary to swing it to an approximately horizontal position when the locking lever 61 may be wedged in the channel formed by the fingers 64 on the collar 65, thus restoring the level condition of the telescope and maintaining the telescope rigidly in place. This manipulation may be rapidly effected and accuracy is assured because the locking lever operates directly on the telescope and at a substantial distance from the pivot axis of the telescope.

It will be noted that the telescope is pivotally supported on one side only, which makes it possible to obtain alignment of the parts in a very simple manner and facilitates machining operations. The bearing plate 30 being of comparatively large diameter insures long wear and prevents lateral tilting of the telescope, while the bearing member 41 serves to properly center the bearing plate and define an axis of rotation. The three spaced bearing pads 35 provide a three-point bearing to insure and maintain a true tilting plane for the telescope and to prevent foreign matter from causing a misalignment of the telescope, since the shoulders formed at their ends will clean the bearing surface with which they co-operate. The same effect is obtained with the three spaced bearing pads 17 on the circular spider plate 14. When the telescope is moved slightly out of line, as by reason of the wear occurring between the bearing pads 35 and the bearing surface 40 after long periods of use, it may be readily adjusted by the manipulation of the screws 50 and 53.

The invention provides a leveling instrument of simple and rugged construction, and one which may be inexpensively manufactured with a substantial degree of accuracy.

What I claim as new and desire to secure by Letters Patent is:

1. In a leveling instrument, the combination of a standard member, a telescope pivotally mounted thereon to swing in a vertical plane, a collar secured to said telescope at a distance from its pivotal axis, and a locking member mounted on said standard member and including a horizontally movable portion adapted to firmly engage said collar to obtain and maintain a horizontal disposition of said telescope.

2. In a leveling instrument, the combination of a standard member, a telescope pivotally mounted thereon to swing in a vertical plane, a collar secured about said telescope at a distance from its pivotal axis and having a laterally opening channel extending longitudinally of the telescope, and a locking lever pivotally mounted on said standard member to swing in a horizontal plane and having a wedge-shaped inner end adapted to engage the walls of said channel to obtain and maintain a horizontal disposition of said telescope.

3. In a leveling instrument, the combination of a standard member, a telescope, a bearing plate secured intermediate the ends of said telescope and disposed at one side thereof, said bearing plate and standard member having co-operating bearing surfaces to permit tilting of said telescope, one of said bearing surfaces comprising three spaced bearing pads to form a three-point bearing, a centrally disposed pivot member interengageable between said bearing plate and standard member for defining the axis of rotation of said bearing plate when tilting said telescope, said bearing pads being disposed about said axis, and a spring urging said bearing plate axially into engagement with said standard member.

4. In a leveling instrument, the combination of a forked standard member, a telescope disposed between the standards formed by the forks of said member, a bearing plate secured intermediate the ends of said telescope and disposed at one side thereof, said bearing plate and the adjacent standard having co-operating circularly spaced and annular bearing surfaces, respectively, and said bearing plate having a central bore normal to the telescope, a pivot member secured in said standard and entering said bore to define the axis of rotation of said bearing plate when tilting the telescope, and a spring mounted on the other standard and acting on the telescope for urging said bearing plate axially into engagement with said first-named standard.

5. In a leveling instrument, the combination of a forked standard member rotatable about a vertical axis, a telescope disposed between the standards formed by the forks of said member, means for supporting the telescope on one of said standards and permitting its tilting movement thereon, means for preventing lateral movement of the telescope with respect to said standard, and means engaging the other standard for laterally adjusting said telescope-supporting standard to place the sighting axis of the telescope in a plane extending through the vertical axis of said standard member.

6. In a leveling instrument, the combination of a forked standard member rotatable on a vertical axis, a telescope disposed between the standards formed by the forks of said member, means for supporting the telescope on one of said standards and permitting its tilting movement thereon, means for preventing lateral movement of the telescope with respect to said standard, threaded adjusting members connecting said standards, said telescope-supporting standard being of reduced cross-section near its base to permit its yielding in a plane normal to the telescope, whereby said telescope may be placed with its sighting axis in a plane passing through the vertical axis of said standard member by moving said telescope-supporting standard by said threaded adjusting members.

7. In a leveling instrument, the combination with a standard member and a telescope supported thereby, of a relatively stationary leveling plate having a circular recess in its upper end, a circular plate secured to said standard member and disposed to rotate about a vertical axis within said recess, said plate having spaced lower bearing surfaces disposed about said axis and adapted to co-operate with a bearing surface formed at the bottom of said recess, and spring means disposed along the axis of said rotatable plate to retain in engagement the bearing surfaces on said rotatable plate and leveling plate.

8. In a leveling instrument, the combination of a forked standard member rotatable about a vertical axis, a telescope pivotally supported for vertical tilting on one of the standards formed by the forks of said standard member, means for preventing lateral movement of the telescope with respect to said standard, and means engaging the other standard and extending between the standards for laterally adjusting the telescope-supporting standard to place the telescope with its sighting axis in a plane extending through the vertical axis of said standard member.

9. In a leveling instrument, the combination of a standard member, a telescope pivotally mounted thereon to swing in a vertical plane, there being abutments on said telescope at a distance from its pivotal axis, and a locking member movably mounted on said standard member at a location spaced laterally from the pivotal axis of said telescope and adapted to engage said telescope abutments for locking said telescope in a true horizontal position, whereby the leveled telescope will be directly supported at two longitudinally spaced points.

10. In a leveling instrument, the combination of a pair of relatively rotatable members having co-operating bearing surfaces, the bearing surface on one of said members being an annular path and that on the other member comprising three bearing pads spaced substantially equal distances apart and disposed about the axis of rotation to form a three-point bearing, means for defining the axis of rotation of said members, and spring means for retaining said bearing surfaces in axial thrust engagement.

In testimony whereof I affix my signature.

CHARLES O. ROTHWEILER.